Oct. 26, 1943.　　　J. C. GOSHORN ET AL　　　2,332,512
VOLUME METER FOR GRANULAR MATERIALS
Filed March 14, 1940　　　2 Sheets-Sheet 1
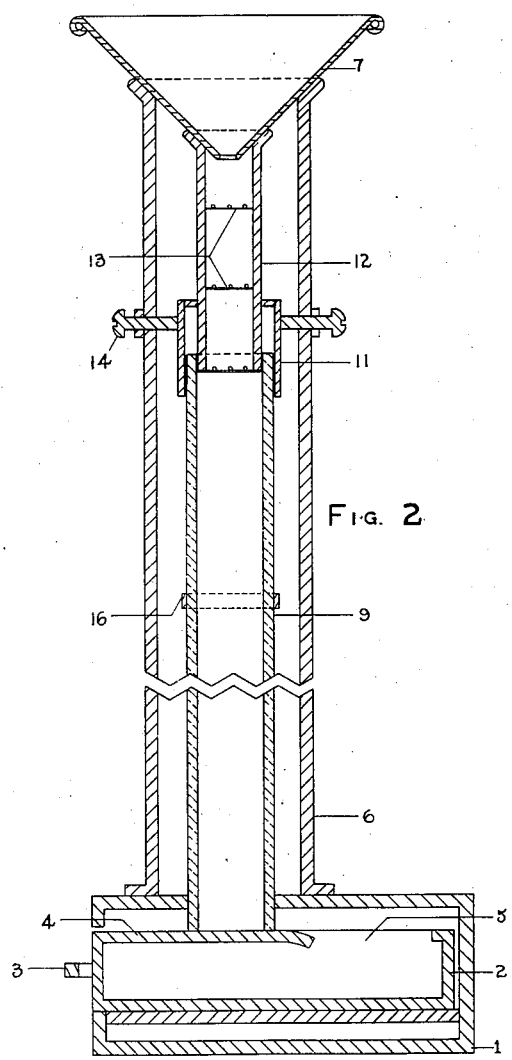
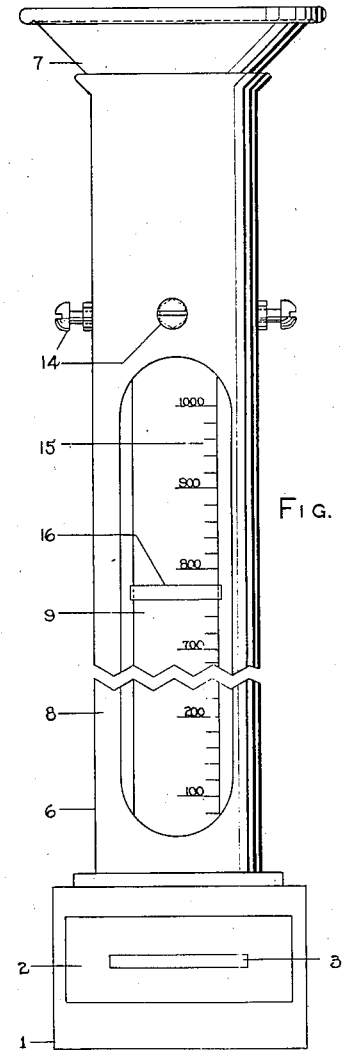
INVENTORS
JOHN C. GOSHORN
AND
WM. E. GROSS
BY Millard F. Cooke
ATTORNEY Oct. 26, 1943.   J. C. GOSHORN ET AL   2,332,512
VOLUME METER FOR GRANULAR MATERIALS
Filed March 14, 1940   2 Sheets-Sheet 2

INVENTORS
JOHN C. GOSHORN
AND
WM. E. GROSS
BY Millard F. Bake
ATTORNEY

Patented Oct. 26, 1943

2,332,512

UNITED STATES PATENT OFFICE 2,332,512

VOLUME METER FOR GRANULAR MATERIALS

John C. Goshorn, Baltimore, and William E. Gross, Joppa, Md., assignors to The Secretary of War of the United States of America and to his successors in office Application March 14, 1940, Serial No. 323,922

4 Claims. (Cl. 226—23)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a volume meter for measuring and packing granular materials. Although not limited thereto, the invention will be described in connection with the measuring of volumes of granular activated charcoal and the filling thereof into gas mask canisters.

In gas mask canisters, it is necessary to pack into each canister a predetermined definite volume of activated charcoal in order to purify air passing through the canister. This charcoal must be so compacted that it will not move sufficiently during use of the canister to allow channels to form, since air passing through such channels would not be purified. However, this compacting must not be so great as to crush the granular particles.

Furthermore, the charcoal used in canisters usually comprises predetermined quantities of different sieve sizes; for example, a definite percentage of 10 to 16 sieve size may be mixed with other sieve sizes such as 12 to 20 size and 16 to 30 size. It is desirable that these various sizes remain evenly distributed within the canister and not segregated by size.

Heretofore, it has been the practice to mix the correct proportions of the various sizes of charcoal and then fill the canister while vibrating it. This vibration is usually in the vertical plane and may be accomplished by a pneumatic or magnetic hammer. This vibration extends the time required for filling and furthermore results in partial segregation of the charcoal into the various sizes.

One object of this invention is to simplify and expedite the filling and packing of granular material into containers.

Another object of the invention is to provide a filling and packing device wherein various sizes and shapes of granular materials may be packed into containers without segregation.

Another object of the invention is to provide a filling and packing device wherein granular materials may be packed into gas mask canisters to maximum capacity without crushing and without the use of vibrating mechanism.

Another object of the invention is to provide an accurate measuring device wherein the quantity of granular materials may be measured more accurately than prior devices.

These and various other objects will be apparent from the following description and claims when taken in connection with the accompanying drawings, wherein Fig. 1 is a front elevation of one form of the invention such as used for measuring.

Fig. 2 is a section on line 2—2 of Fig. 1.

Figure 4:
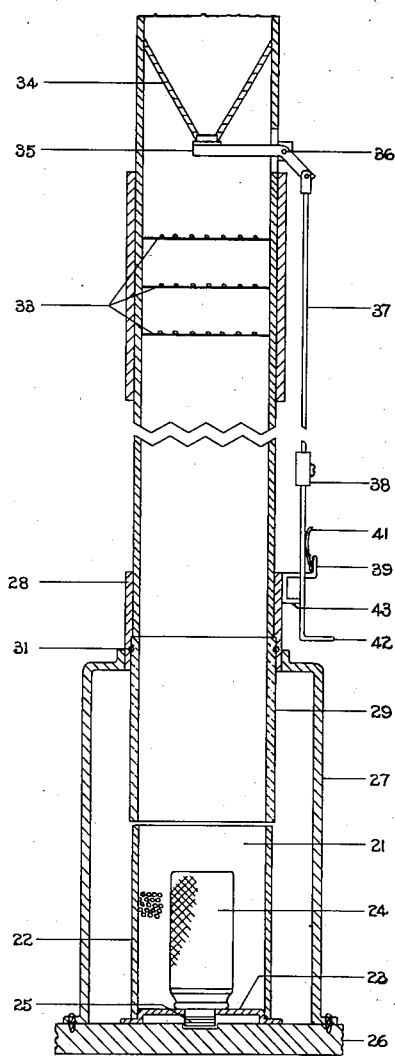
Fig. 4 is a section on line 4—4 of Fig. 3.

In general, this invention utilizes the discovery by the inventors that when granular particles are allowed to fall freely, each particle in a straight line, the particles will uniformly pack themselves into a compact mass. The mass thus formed will uniformly occupy the same volume under repeated tests within about 0.15%, which is well within the limits of errors of reading. Prior filling devices, including vibrating machines, have been found to be accurate only to about 1%.

Referring now to Figs. 1 and 2, wherein the invention is shown in connection with a measuring device or volume meter, a base 1 is adapted to be placed on a table or work bench, and has a sliding drawer 2 having a handle 3. The upper surface of the drawer has a cover 4 which covers only part of the drawer, opening 5 being provided at the rear.

Secured to and extending vertically from the upper surface of base 1 is a metal tube 6, having its upper end slightly flared and supporting a funnel 7. Tube 6 has an elongated sight opening 8 to observe the inner glass tube 9. Glass tube 9 projects through base 1 and its open lower end terminates in close proximity to top 4 of drawer 2. The open upper end of glass tube 9 is telescoped into a metal tube 11, and has telescoped within it an inner metal tube 12. Metal tubes 11 and 12, and glass tube 9 are secured together, as by cement, so that they will remain in vertical alignment.

The outlet of funnel 7 projects into tube 12. Tube 12 has three wire mesh screens 13 secured therein and spaced from one another. In one practical embodiment of this form of the invention which has been successfully used for measuring gas mask charcoal, these screens are number four mesh, and are spaced about one and one-half inches apart. It has been found that the accuracy of this meter depends to a large extent upon the vertical position of the tubes. In order that tubes 9, 11 and 12 may be adjusted to an exact vertical position, four adjusting screws are threaded through outer tube 6 and contact with tube 11, each screw having a lock nut. Any convenient means may be provided to ascertain when the tubes are in vertical position.

Operation of this form of the invention is as follows: With the drawer 2 inserted as shown, the granular materials are mixed in the desired proportions and are poured into funnel 7. The particles are checked by the three screens 13 and are thus evenly distributed over the cross-section of the tubes. When the particles pass through lower screen 13, they have a free vertical fall, unobstructed by projecting surfaces. The particles collect on top of drawer 2, and the quantity may be read from the graduations 15 on glass tube 9 by aligning upper edges of slide 16 with the upper surface of the granular material.

In the embodiment shown, the tube 9 is a 1000 cc. graduate. The drawer 2 is then slowly withdrawn and the material falls into the drawer through opening 5. For materials such as granular charcoal of sieve sizes from 6 to 30, there should be a free fall of about 60 inches below the lower screen 13.

This device may be used as an anti-segregation apparatus for pouring mixtures of granular materials of different sizes or densities. It can be used as a measuring device where exact quantities of granular materials are desired, or it can be used to check the performance and efficiency of other types of filling machines.

The granular materials remain uniformly mixed and pack themselves so consistently that repeated tests may be duplicated within the limits of accuracy of reading. No shaking or vibrating it necessary, since the particles spread evenly to a level surface. The factors which cause segregation and inaccurate results, such as vibration, rebounding of the particles from one another, piling and rolling, are all eliminated in this machine.

Figure 3:
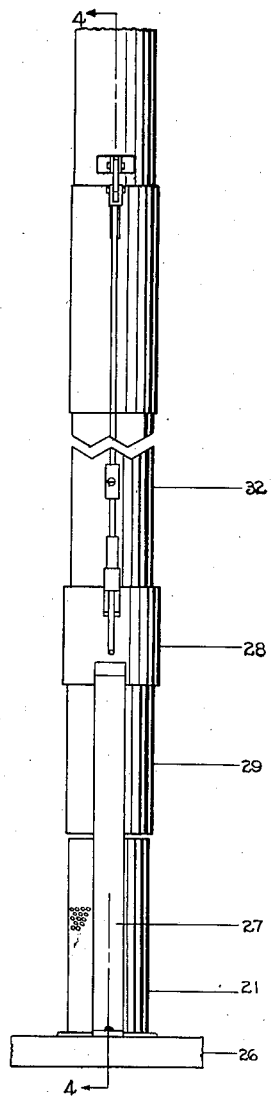
Fig. 3 is a side elevation of another form of the invention wherein the granular materials are fed directly into a gas mask canister.

In the form shown in Figs. 3 and 4, the granular materials are packed directly into a container, in this case a gas mask canister. The canister 21 comprises a perforated oval-shaped container 22 having the upper end open, and a closure 23 on its lower end. Projecting upwardly into the canister is a centrally positioned fabric bag 24 which covers and protects outlet 25.

Canister 21 is placed on the support 26 beneath the filling and packing machine. Two strap brackets 27 are secured to support 26 and are turned inwardly at their upper ends and are secured to a tubular member 28. The member 28 supports a glass tube 29, as by a wire 31 recessed into both tubes. Metal tube 32 is secured to tube 28, and has secured therein near its upper end three wire mesh screens 33. The lowest screen is spaced a substantial distance above canister 21, preferably about 60 inches for packing charcoal.

At its upper end, tube 32 has a funnel 34 with its lower end controlled by valve 35 pivoted at 36. Vertically movable valve operating handle 37 has a weight 38 thereon for normally biasing the valve to closed position. Handle 37 passes through guide bracket 39 which carries a spring 41 bearing against the handle, so that when the angular handle portion 42 is raised to open the valve, the spring 41 presses this portion back to rest on flange 43, whereby the valve 35 is held in open position.

The gas mask canister 21 used to illustrate this form of the invention is oval in cross-section, and tubes 28, 29 and 32 are of similar shape. This is necessary to provide free and unobstructed fall of the particles. If other shapes of receptacles are used for packing the granular materials, the tubes should preferably be changed accordingly to conform thereto.

In operation, the funnel 34 may be connected to a storage bin. When valve 35 is opened by raising handle 37, the pre-mixed granular charcoal passes through screens 33. Each screen serves to check the particles temporarily and spread them evenly over the cross-section of the tube. Then the particles have a free fall directly into the canister 21, wherein they pack themselves with maximum density. The flow of material is observed through glass tube 29, and when the canister is level full, valve 35 is closed, the full canister removed, and an empty one put in place.

It will be understood that the filling device of Figs. 3 and 4 is well adapted for rapid filling of canisters.

The degree of compactness of the particles is determined by the velocity at which the particles enter the canister. There are various ways of changing this velocity, such as changing the distance of fall of the particles by varying the length of the tubes, or by introducing a jet of air with the particles through the funnel. In this latter case, the air may escape between the open top of canister 21 and glass tube 29, or a suction hose may be connected to the outlet 25 of the canister. It should be understood that the device according to Figures 1 and 2 is used where it is not important to have the material in compact and uniform condition when in the drawer 2. In this device, uniformity of packing is required only for, and during, the measuring operation which is done in the measuring tube 9. Uniformity of packing is not required thereafter.

Where uniformity of packing in the gas mask canister, or other container, is required, the device according to Figures 3 and 4 is used, allowing the granular material to fall directly into the canister. When using the device of Figures 3 and 4 to fill canisters, check measuring tests may be made from time to time by diverting portions of the granular material into the measuring device of Figures 1 and 2 to be measured therein.

Although illustrated in connection with the measuring and packing of gas mask charcoal, it will be understood that the invention is not limited thereto. Various changes will suggest themselves to those skilled in the art without departing from the scope of this invention.

We claim:

1. Apparatus for packing granular particles of mixed sizes without segregation thereof comprising a vertical tube, means to feed mixed size particles into the upper end of said tube, a plurality of spaced perforated members extending across said tube adjacent its upper end for momentarily arresting the fall of and spreading said particles, and a receptacle at the lower end of said tube into which said particles fall and pack, the whole being so constructed and arranged that the particles have a free and unobstructed fall for a distance of approximately sixty inches.

2. Apparatus for accurately measuring the volume of granular charcoal comprising a vertical tube having a length in excess of sixty inches, means to feed charcoal into the upper end of said tube, a plurality of spaced mesh screens extending across said tube adjacent its upper end for momentarily arresting the fall of and spreading the charcoal evenly over the area of the tube, an enclosure at the bottom of said tube into which the charcoal falls, and means for measuring the volume of charcoal in said enclosure.

3. Apparatus for filling and packing granular charcoal into gas mask canisters comprising a vertical tube, means for feeding charcoal into the upper end of said tube, a series of spaced mesh screens within said tube adjacent its upper end to momentarily check the fall of the charcoal, means for supporting a canister beneath the lower end of said tube, said tube providing a free unobstructed fall of approximately sixty inches for the charcoal directly into the canister, and a transparent section through which the charcoal packed into the canister may be observed.

4. An apparatus for uniformly mixing and packing granules of varying sieve size comprising a support, a vertical tube mounted thereon and having a lower end adapted to have a receiving receptacle positioned thereunder, a funnel at the upper end of the tube provided with a discharge orifice of a diameter materially less than the diameter of the tube and through which a mixture of granules of varying sieve size pass gravitationally into the tube, a series of vertically spaced screens mounted in the tube below said funnel and each having an area substantially equal to the internal diameter of the tube for momentarily arresting downward movement of each granule at successive intervals, the uppermost of said screens being closely spaced downwardly from the funnel, and the lowermost of said screens being spaced upwardly from the lower end of said tube a distance approximately twenty times the space interval between said uppermost and said lowermost screens so as to provide for a free and unobstructed fall of the granules through said tube for a substantial portion of the length of said tube, whereby the granules will uniformly pack themselves in a receiving receptacle when the latter is positioned beneath the lower end of said tube.

JOHN C. GOSHORN.
WILLIAM E. GROSS.